(12) United States Patent
Utsunomiya (10) Patent No.: US 7,199,352 B2
(45) Date of Patent: Apr. 3, 2007

(54) MEASURING METHOD AND DEVICE FOR MEASURING DISTRIBUTION OF SENSITIVITY

(75) Inventor: Daisuke Utsunomiya, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 155 days.

(21) Appl. No.: 11/098,402

(22) Filed: Apr. 5, 2005

(65) Prior Publication Data

US 2005/0218304 A1    Oct. 6, 2005

(30) Foreign Application Priority Data

Apr. 5, 2004    (JP)    ............... 2004-111213

(51) Int. Cl.
*H01J 40/14* (2006.01)
*G01N 21/55* (2006.01)

(52) U.S. Cl. ............... 250/215; 356/445; 356/446; 356/448

(58) Field of Classification Search ............... 250/215, 250/203.1, 203.2, 559.11, 559.1, 206.2; 356/445, 356/446, 448, 243.4, 243.1
See application file for complete search history.

(56) References Cited

U.S. PATENT DOCUMENTS 5,473,167 A    12/1995    Minnis

2005/0055172 A1*    3/2005    Flaherty ............... 702/117

FOREIGN PATENT DOCUMENTS

JP    2001-175799 A    6/2001
JP    2001-312688 A    11/2001

* cited by examiner

*Primary Examiner*—Akm Ullah
*Assistant Examiner*—Francis M. LeGasse, Jr.
(74) *Attorney, Agent, or Firm*—Sughrue Mion, PLLC (57) ABSTRACT

A measuring device measures sensitivity distribution of a photo sensor including a light projector element for projecting detection light externally, and a photoreceptor element for receiving the detection light reflected externally, and photoelectrically detects an article. The measuring device includes a test panel, having a test pattern, formed on a surface thereof and in at least two colors, for being read by the photo sensor photoelectrically for inspection. A moving mechanism moves the test panel relative to the photo sensor and at a regular speed. A controller actuates the moving mechanism, and evaluates an output from the photoreceptor element, in order to determine the sensitivity distribution of the photo sensor according thereto. Sensitivity distribution of the photo sensor is initially expressed two-dimensionally. Also, a plurality of the sensitivity distribution being obtained are used to determine sensitivity distribution of the photo sensor expressed three-dimensionally.

21 Claims, 10 Drawing Sheets

MEASURING METHOD AND DEVICE FOR MEASURING DISTRIBUTION OF SENSITIVITY

BACKGROUND OF THE INVENTION

1. Field of the Invention

The present invention relates to a measuring method and apparatus for measuring distribution of sensitivity. More particularly, the present invention relates to a measuring method and apparatus for measuring distribution of sensitivity of a photo sensor both with high precision and with great ease.

2. Description Related to the Prior Art

A photo sensor of a reflection type is known for example in JP-A 2001-312688. The photo sensor includes a light projector and a photoreceptor. The light projector projects light or a beam for photoelectric detection. The photoreceptor receives and detects light reflected by an article to be detected after emission from the light projector. The photo sensor is used as a reader for reading an information code formed on a winder core which is used in a photographic printer as a core of a roll.

If the photo sensor is used, it is necessary to adjust positioning in the attachment, electric correction of outputs and other calibration for the purpose of optimizing the sensitivity to light. It is likely that a manufacturing cost will be higher because of additionally complicated operation required for the adjustment and correction.

To solve such a problem, there is a light detecting device of JP-A 2001-175799 including an amplifier, an A/D converter, a microcomputer and a resistor circuit. The amplifier amplifies an output of the photoreceptor. The A/D converter converts the output of the amplifier into a digital signal. The microcomputer changes an output level of the photoreceptor according to data of the digital signal. The resistor circuit is controlled by the microcomputer, for varying the output level of the photoreceptor at a point before the amplifier.

Also, testing of sensitivity of a photo sensor is known, for example, U.S. Pat. No. 5,473,167 (corresponding to JP-A 8-050094).

Although the S/N ratio of the photo sensor can be increased according to JP-A 2001-175799, a characteristic of the photo sensor cannot be found in a detailed manner. It is likely to use the light detecting device at not very high sensitivity of photo sensor. This is a structure unsuitable for the use in detection with higher precision.

SUMMARY OF THE INVENTION

In view of the foregoing problems, an object of the present invention is to provide a measuring method and apparatus for measuring distribution of sensitivity of a photo sensor both with high precision and with great ease.

In order to achieve the above and other objects and advantages of this invention, a measuring method of measuring distribution of sensitivity of a photo sensor is provided, wherein the photo sensor has a light projector disposed on a sensor surface, and a photoreceptor disposed on the sensor surface. The photo sensor is disposed to oppose the sensor surface to a test panel which has a test pattern formed on a surface thereof. The photo sensor is shifted rotationally and stepwise while the sensor surface is opposed to the test panel. The test panel is moved relative to the photo sensor at each time of rotational shifting of the photo sensor. An output of the photoreceptor is monitored and received while the test panel moves relatively. The sensitivity distribution expressed two-dimensionally is determined according to the output of the photoreceptor. The sensitivity distribution expressed two-dimensionally is synthesized at respective times of the rotational shifting, to determine three-dimensionally expressed sensitivity distribution.

The test panel is moved relative to the photo sensor at a regular speed.

The test pattern of the at least two colors comprises a high-reflectance region and a reference portion formed therein and having a low reflectance.

The reference portion having the low reflectance comprises a reference line.

Furthermore, there is a step of obtaining a sensitive width of the photo sensor and a highest sensitivity point where the sensitivity is highest on the sensor surface according to the output and the positioning obtained upon passage of the reference line with the low reflectance, so as to determine the sensitivity distribution expressed two-dimensionally.

In one preferred embodiment, the reference portion with the low reflectance comprises a reference line and a low-reflectance region.

Furthermore, a highest sensitivity point where the sensitivity is highest is obtained on the sensor surface according to the output and the positioning obtained upon passage of the reference line with the low reflectance. A sensitive width of the photo sensor is obtained according to the output and the positioning obtained upon passage of the low-reflectance region, so as to determine the sensitivity distribution expressed two-dimensionally.

The test panel comprises a test disk for rotating about a center thereof, and the reference line extends across an arc of one circle that is concentric with the test disk.

The low-reflectance region is defined and surrounded by a contour line, and at least one portion of the contour line extends across an arc of one circle that is concentric with the test disk.

In another preferred embodiment, the test panel is moved in such a cyclic moving sequence for starting in an initial manner upon completion of moving of the test panel. The moving sequence includes moving in an Nth moving direction through an Nth section, and moving through an (N+1)th section starting at an end of the Nth section and in a (N+1) moving direction that is different from the Nth moving direction. The reference line extends across at least one of plural moving directions predetermined in the moving sequence.

In still another preferred embodiment, the reference portion with the low reflectance comprises a reference dot.

Furthermore, the sensitivity distribution expressed three-dimensionally of the photo sensor is displayed.

The high-reflectance region is white, and the reference portion having the low reflectance is black.

According to one aspect of the invention, a measuring device measures sensitivity distribution of a photo sensor including a light projector element for projecting detection light externally, and a photoreceptor element for receiving the detection light reflected externally, and photoelectrically detects an article. The measuring device includes a test panel, having a test pattern, formed on a surface thereof and in at least two colors, for being read by the photo sensor photoelectrically for inspection. A moving mechanism moves the test panel relative to the photo sensor and at a regular speed. A controller actuates the moving mechanism, and evaluates an output from the photoreceptor element, in order to determine the sensitivity distribution of the photo sensor according thereto.

Furthermore, a shifting mechanism changes positioning of a sensor surface of the photo sensor and the test pattern in a stepwise manner and for plural times, the sensor surface being defined on the light projector element and the photoreceptor element. The controller drives the moving mechanism at each time that the shifting mechanism shifts and changes the positioning, and determines sensitivity distribution of the photo sensor expressed two-dimensionally, according to an output of the photoreceptor element in shifting of the shifting mechanism, and synthesizes a plurality of the sensitivity distribution being obtained, to determine sensitivity distribution of the photo sensor expressed three-dimensionally.

Specifically, a first determining unit determines said sensitivity distribution expressed two-dimensionally according to an output of said photoreceptor while said test panel moves relatively. A second determining unit synthesizes said sensitivity distribution expressed two-dimensionally at respective times of said rotational shifting, to determine three-dimensionally expressed sensitivity distribution.

The test panel is rotatable, of which the surface has a white color. The test pattern has a circle eccentric with respect to a rotational center of the test panel, and a black line. The circle has first and second semicircles, the first semicircle has a contour line of a black color and a white region defined inside the contour line, the second semicircle has a black color, and the line is constituted by an extension of a borderline between the first and second semicircles.

The test panel is a test disk, and the line extends toward a periphery of the test disk.

The first determining unit determines a point where sensitivity of the photo sensor is maximized according to the output of the photoreceptor and the rotational shifting during passage of the contour line or the line in front of the photo sensor. A sensitive width of the photo sensor is determined according to the output of the photoreceptor and the rotational shifting during passage of the second semicircle in front of the photo sensor. A triangular region having a vertex at the maximum-sensitivity point and a base line along the sensitive width is determined, to define the sensitivity distribution expressed two-dimensionally.

The surface of the test panel has a white color, the test pattern has a black line. The first determining unit determines a point where sensitivity of the photo sensor is maximized, and a sensitive width of the photo sensor, according to the output of the photoreceptor and the rotational shifting during passage of the line in front of the photo sensor. A triangular region having a vertex at the maximum-sensitivity point and a base line along the sensitive width is determined, to define the sensitivity distribution expressed two-dimensionally.

In one preferred embodiment, the photo sensor moves relative to the test panel being stationary.

The surface of the test panel has a white color, and the test pattern has a black region in a substantially quadrilateral shape, and a black line extending from one side of the black region.

In another preferred embodiment, the surface of the test panel has a white color, and the test pattern has at least one black dot.

Consequently, it is possible to measure distribution of sensitivity of a photo sensor both with high precision and with great ease, because of the effective use of the test pattern on the test panel having a simplified structure.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
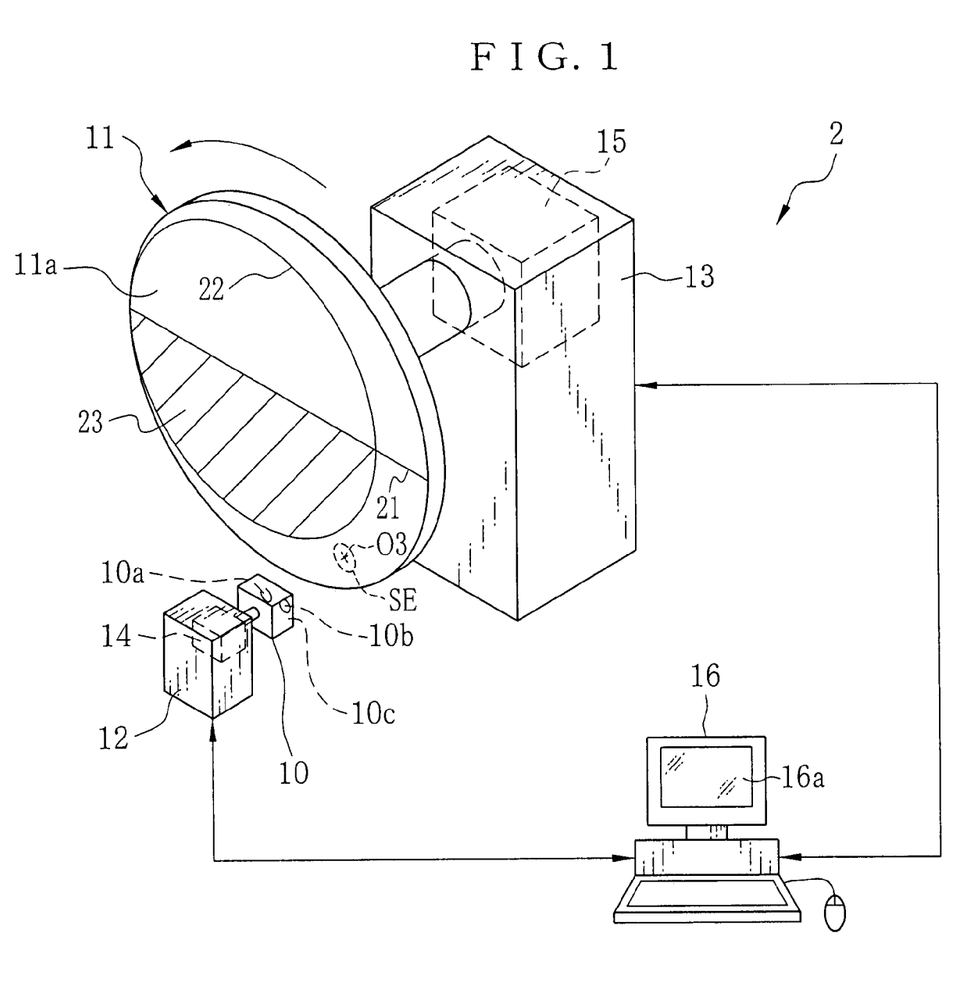
FIG. 1 is a perspective view illustrating a measuring device.

In FIG. 1, a sensitivity distribution measuring device 2 or sensor characteristic sampling device 2 includes a test disk 11 as a test panel, a sensor holder 12, a test disk holder 13 as a test panel holder, a first stepping motor 14, a second stepping motor 15, and a host computer 16. A photo sensor 10 or photo sensor unit to be inspected according to the invention is supported on the sensor holder 12 in a rotatable manner. The test disk holder 13 supports the test disk 11 in a rotatable manner. The first stepping motor 14 as a shifting mechanism is contained in the sensor holder 12, and causes the photo sensor 10 to rotate. The second stepping motor 15 as a moving mechanism is contained in the test disk holder 13, and causes the test disk 11 to rotate. The host computer 16 controls various elements constituting the entirety of the measuring device 2.

The photo sensor 10 is a reflection type, and includes a light projector element 10a as light projector, and a photoreceptor element 10b as photoreceptor. On a test surface 11a of the test disk 11, the light projector element 10a projects light or a beam for photoelectric detection. The photoreceptor element 10b receives and detects light reflected by the test disk 11 in response to emission from the light projector element 10a. An output signal is generated by the photoreceptor element 10b in the photo sensor 10, and transmitted to the host computer 16.

The stepping motors 14 and 15 are controlled in compliance with instruction signals output by the host computer 16. The first stepping motor 14 causes a sensor surface or disposition surface 10c of the photo sensor 10 having the light projector element 10a and the photoreceptor element 10b to rotate relative to the test surface 11a intermittently at a prescribed angle, for example 45 degrees. The second stepping motor 15 causes the test disk 11 to rotate relative to the photo sensor 10 at a regular rotational speed in the counterclockwise direction indicated by the arrow.

The host computer 16 transmits instruction signals to the stepping motors 14 and 15, and also receives an output from the photoreceptor element 10b of the photo sensor 10. A monitor display panel 16a is included in a user interface of the host computer 16 having a keyboard, mouse and the like. A waveform of the output of the photoreceptor element 10b is displayed on the monitor display panel 16a. Also, it is possible to display measured distribution of sensitivity of the photo sensor 10.

Figure 2:
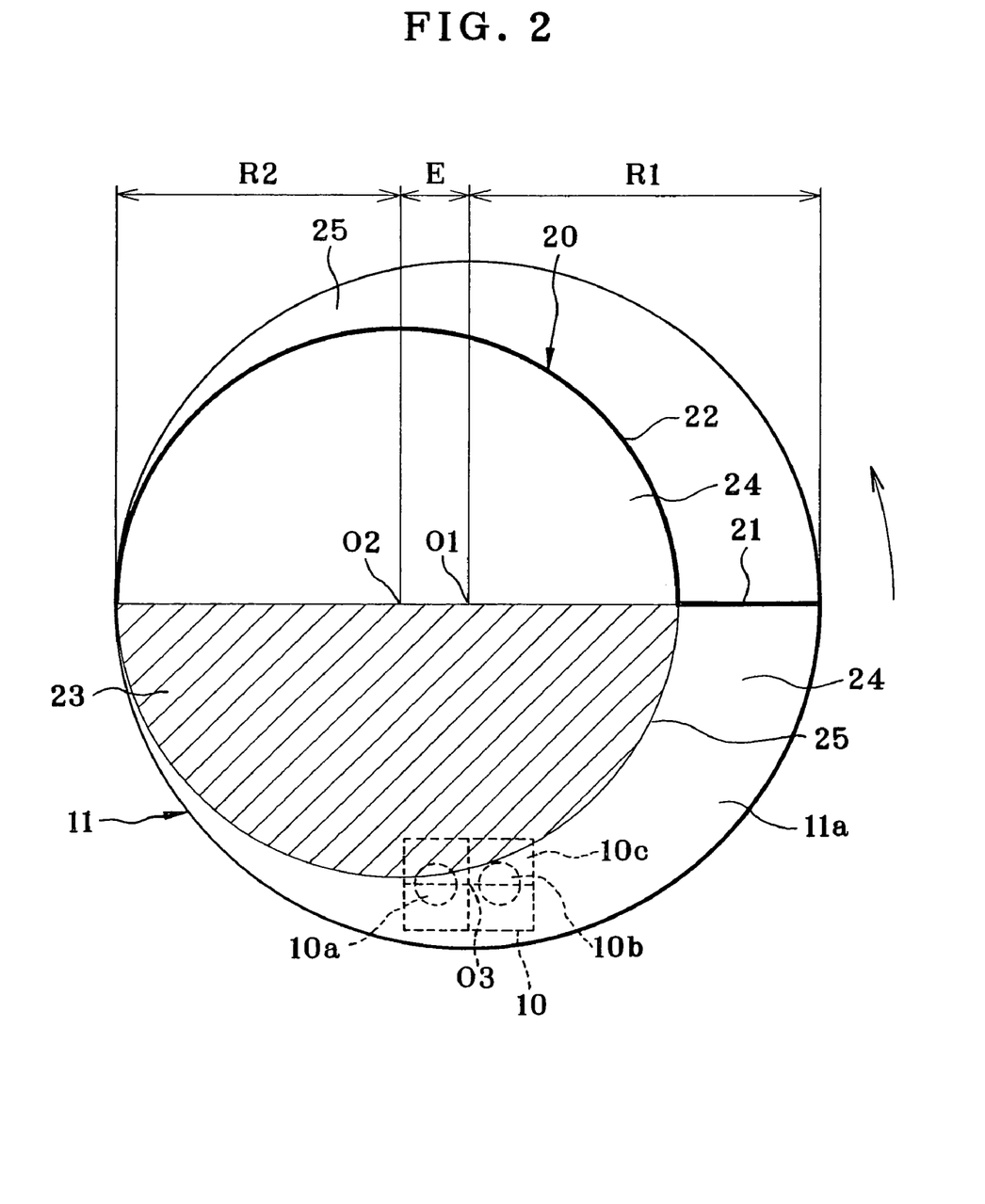
FIG. 2 is a front elevation illustrating of a test disk.

In FIG. 2, the test disk 11 is circular, and has a radius R1 and a center O1. An eccentric circle 20 is formed on the test surface 11a as a clearly distinct black indicia. A diameter or a chord 21 extends to pass through the center O1. The eccentric circle 20 has a center 02 offset from the center O1 by the amount E, and is a circle internally tangential to the circumference of the test disk 11, and has radius R2=R1−E. A test pattern or test image on the test disk 11 includes a low-reflectance or black reference line 22, a low-reflectance or black region 23, and a high-reflectance or white region 24. The low-reflectance reference line 22 is disposed in an upper semicircle defined by the chord 21. The low-reflectance region 23 is disposed in a lower semicircle defined by the chord 21. The high-reflectance region 24 is disposed in the lower semicircle as a remaining region. The chord 21 is used as a reference indicia for detection of a rotational reference position of the test disk 11 at the time of having made half a rotation of the test disk 11.

The sensor surface 10c of the photo sensor 10 is oriented as indicated by the phantom line to face the test surface 11a directly by holding of the photo sensor 10 and the test disk 11 in the sensor and disk holders 12 and 13. When one rotation of the test disk 11 is made, the photo sensor 10 moves relative to the test disk 11 in a sequence of the low-reflectance reference line 22, the high-reflectance region 24, the chord 21, the high-reflectance region 24, the low-reflectance region 23, and then the high-reflectance region 24.

The operation of measuring the distribution of the sensitivity of the photo sensor 10 by use of the measuring device 2 is described by referring to FIGS. 3–8. At first the photo sensor 10 is secured to the sensor holder 12. The sensor and disk holders 12 and 13 are disposed suitably. A distance Lsens is measured between the center O1 of the test disk 11 and the point O3, which is a center of a sensitivity region SE of the photo sensor to define the sensitivity distribution. See FIG. 3.

After the distance Lsens is measured, the second stepping motor 15 is driven by the control of the host computer 16. The test disk 11 is caused to make one counterclockwise rotation at a regular speed relative to the photo sensor 10. The counterclockwise direction is indicated by the arrow in the drawing. A locus 30 is formed by movement of a projected point of the center O3 of the sensor surface 10c as viewed on the test surface 11a. This is indicated by the phantom line in FIG. 3.

Figure 3:
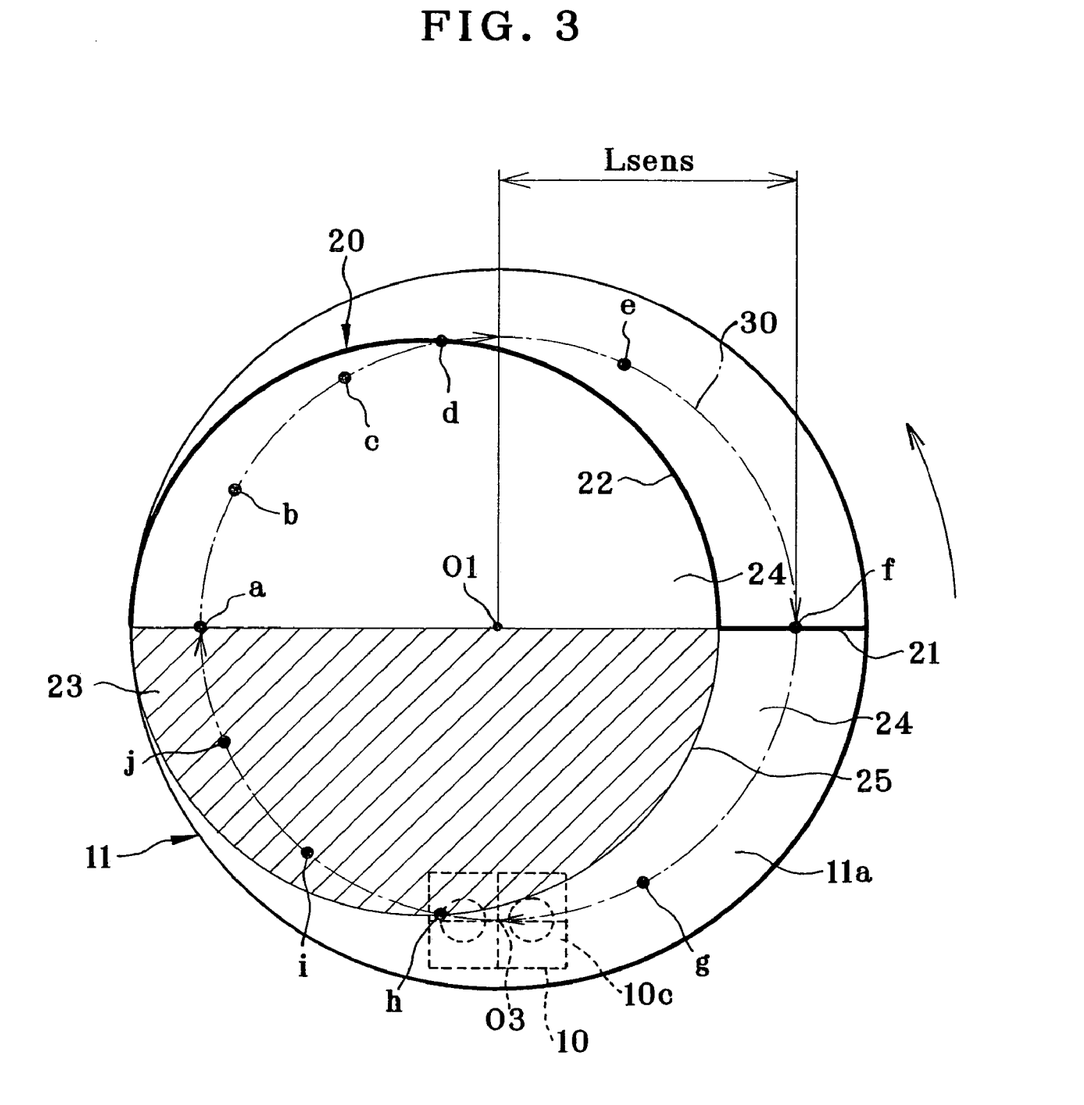
FIG. 3 is a front elevation illustrating the surface of the test disk with a locus of a photo sensor.

The locus 30 is a circle having a radius Lsens about a rotational center O1, and extends to pass points a, b, c, d, e and f serially as a first semicircle. The point a is where a half of the sensor surface 10c as projected on the test surface 11a overlaps on the low-reflectance region 23. The point b is where the sensor surface 10c comes away from the low-reflectance region 23 and becomes entirely opposed to the high-reflectance region 24. The point c is where a portion of the sensor surface 10c starts overlapping on the low-reflectance reference line 22. The point d is where the center O3 of the sensor surface 10c moves across the low-reflectance reference line 22. The point e is where the sensor surface 10c comes away from the low-reflectance reference line 22 and becomes entirely opposed to the high-reflectance region 24. The point f is where the center O3 of the sensor surface 10c moves across the chord 21. Then the locus 30 extends to pass points g, h, i and j and then the point a serially as a second semicircle. The point g is where a portion of the sensor surface 10c starts overlapping on the low-reflectance region 23. The point h is where the center O3 of the sensor surface 10c moves across a contour line 25 as borderline defined between the low-reflectance region 23 and the high-reflectance region 24. The points i and j are where the sensor surface 10c comes away from the low-reflectance reference line 22 and becomes entirely opposed to the low-reflectance region 23.

Figure 4:
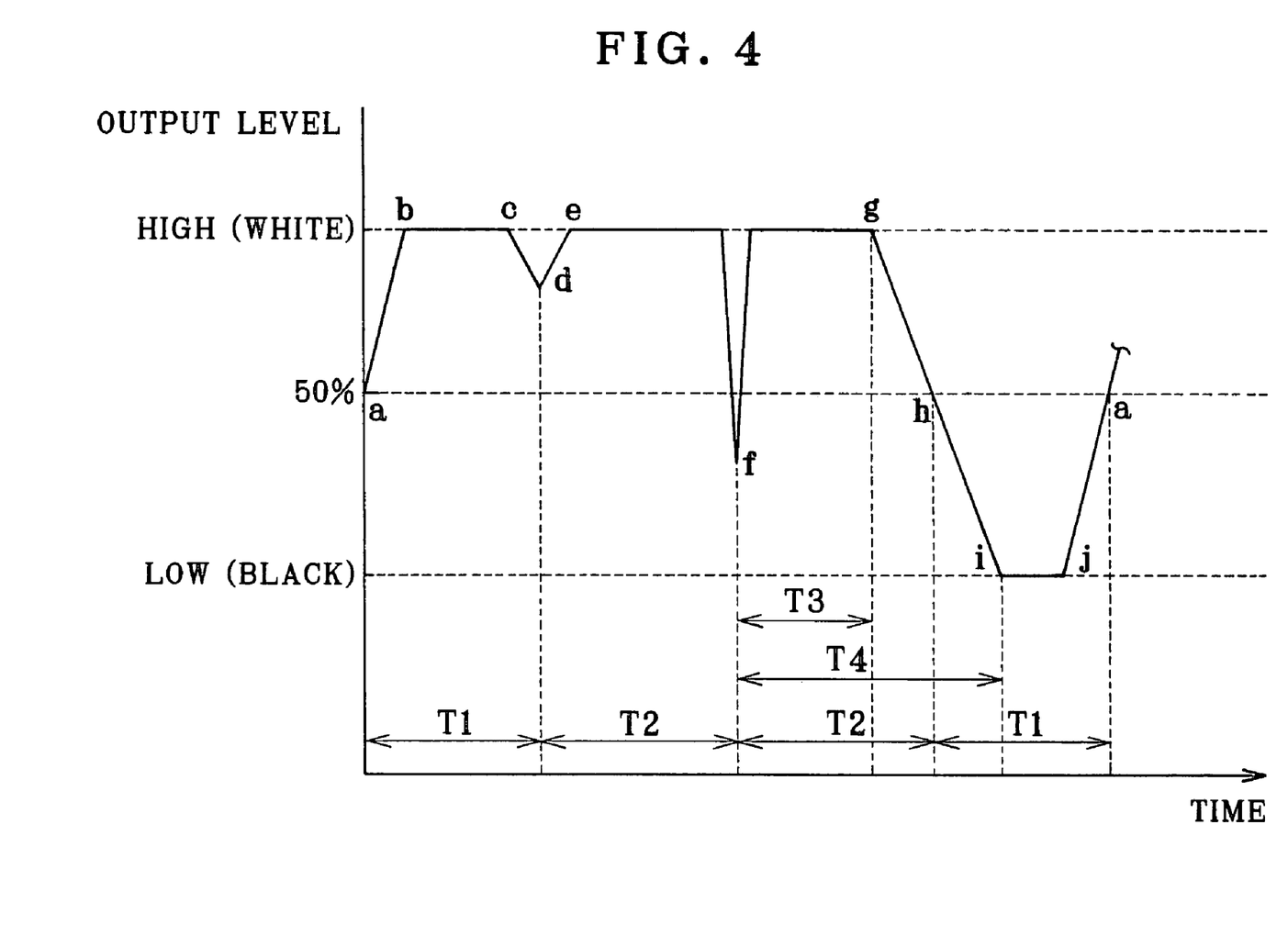
FIG. 4 is a graph illustrating a waveform of one wave of the output of the photoreceptor element upon one rotation of the test disk.

As the photo sensor 10 moves on the locus 30, the output of the photoreceptor element 10b has a waveform schematically shown in FIG. 4. In the vicinity of the point a, a half of the sensor surface 10c as projected on the test surface 11a overlaps on the low-reflectance region 23. The output is at a level of 50% or so which is between the High level upon detecting the high-reflectance region 24 and the Low level upon detecting the low-reflectance region 23. When the sensor surface 10c comes away from the low-reflectance region 23, the sensor surface 10c comes from the point b where the sensor surface 10c comes into the high-reflectance region 24 to the point c where a portion of the sensor surface 10c starts overlapping on the low-reflectance reference line 22. Then the output is at the High level by the passage of the high-reflectance region 24. When the sensor surface 10c comes from the point c to the point d where the center O3 of the sensor surface 10c moves across the low-reflectance reference line 22, then the output becomes lower from the High level owing to passage of the low-reflectance reference line 22. The sensitivity becomes the highest in the vicinity of the point d.

In the section from the vicinity of the point d to the vicinity of the point e where the sensor surface 10c comes away from the low-reflectance reference line 22 and becomes included in the high-reflectance region 24, there occurs a rise in the output according to passage of the low-reflectance reference line 22. In the vicinity of the point e, the output comes up to the High level again. In the vicinity of the point f where the center O3 of the sensor surface 10c moves across the chord 21, there occur a drop and then rise in the output according to passage of the chord 21. This represents half a rotation of the test disk 11 relative to the photo sensor 10.

In the section starting at the vicinity of the point f and ending at the vicinity of the point g where the sensor surface 10c starts overlapping on the low-reflectance region 23 succeeding to the high-reflectance region 24, the output of the photoreceptor element 10b is at the High level owing to the passage of the high-reflectance region 24. In the section starting at the vicinity of the point g and ending at the point i where the sensor surface 10c becomes covered in the low-reflectance region 23, the output of the photoreceptor element 10b comes down from the High level to the Low level owing to the passage of the low-reflectance region 23. The sensitivity or the output becomes maximized nearly at the point h between the point i and a point g or where the center O3 of the sensor surface 10c comes across the contour line 25 defined between the low-reflectance region 23 and the high-reflectance region 24. In the section between the points i and j, the output is at the Low level in passage of the low-reflectance region 23. In the vicinity of the point a, the output becomes again at the level of 50%.

Figure 5:
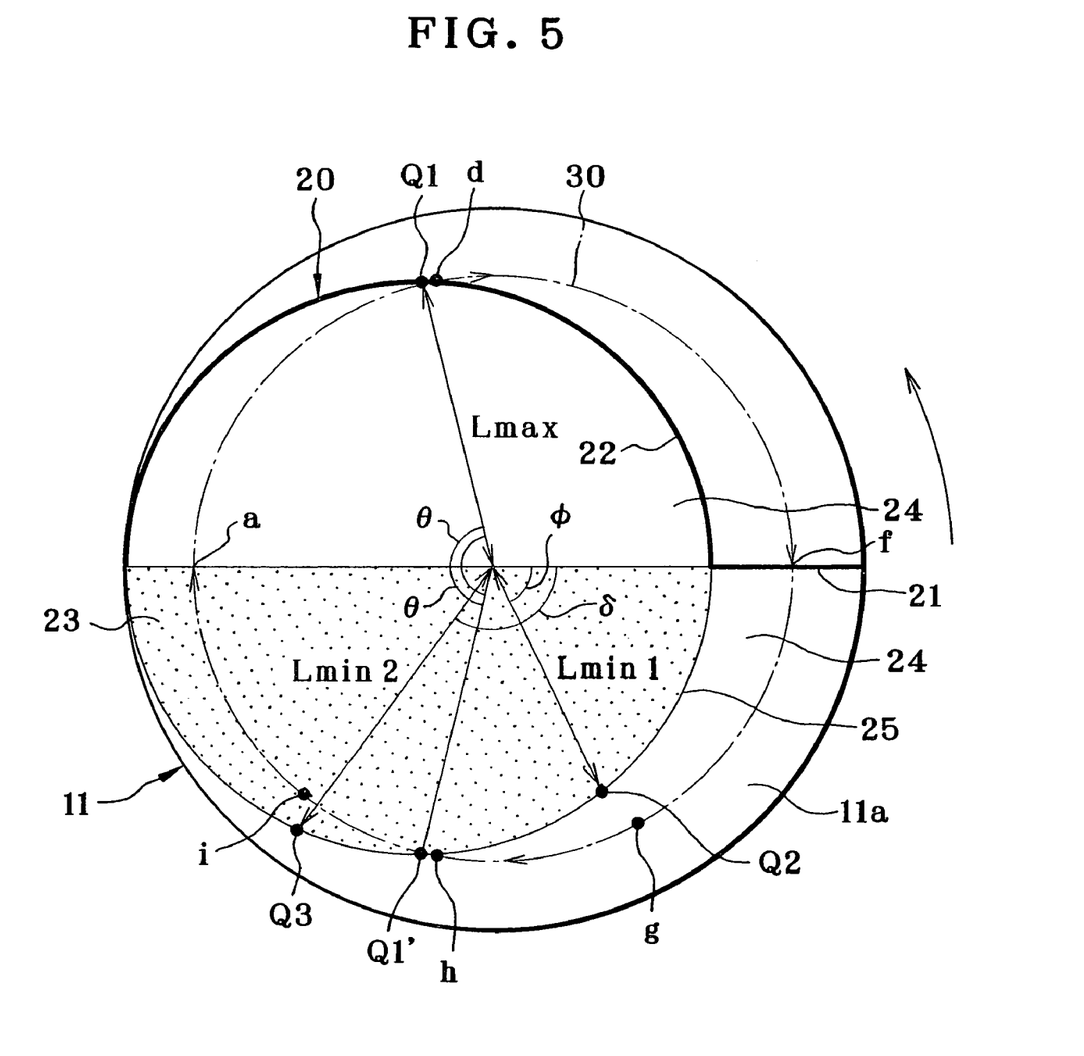
FIG. 5 is a front elevation illustrating the surface of the test disk in which Lmax, Lmin1 and Lmin2 are indicated.
Figure 6:
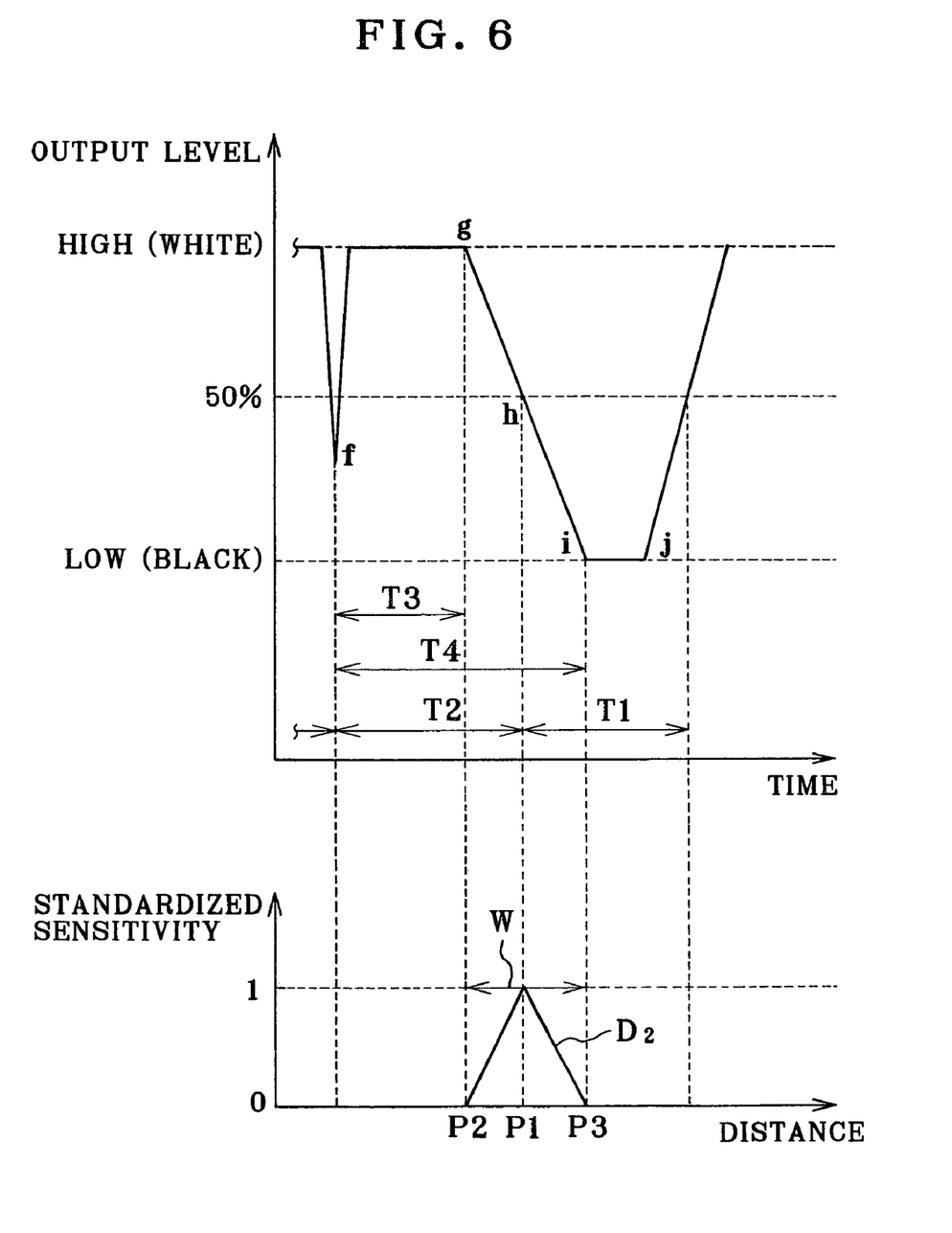
FIG. 6 is a graph illustrating a waveform of a second half of one wave of the output of the photoreceptor element, with a two-dimensionally expressed sensitivity distribution.

In FIG. 5, let P1 be a point located on the sensor surface 10c and where the sensitivity of the photo sensor 10 is maximized. See also FIG. 7. Let Q1 be a point on the low-reflectance reference line 22 and obtained by projecting the point P1 on to the test surface 11a. The point Q1 exists in the vicinity of the point d where the output of the photoreceptor element 10b is the lowest. The host computer 16 determines a distance Lmax from the point Q1 to the center O1 of the test disk 11 by the equation of:

$$Lmax = E\cos\theta + [(R2)^2 - (E\sin\theta)^2]^{1/2}$$

An angle θ (in radian) is defined between the chord 21 and a line that passes the point Q1 and the rotational center O1 of the test disk 11. See FIG. 4. Let T1 be measured time elapsed while the output of the photoreceptor element 10b comes between a first point close to the point a and the point Q1, the first point being where the photoreceptor element 10b outputs at 50%. Let T2 be measured time elapsed while the output of the photoreceptor element 10b comes from the point Q1 to a point close to the point f. The angle θ has a value expressed by T1 and T2 as follows:

$$\theta = \pi T1/(T1+T2)$$

The host computer 16 evaluates the initial distance of Lmax and a second distance of Lmax upon making a one fourth rotation of the photo sensor 10, and determines a position of the point Q in a two-dimensional disposition. Also, the host computer 16 determines the point P1 of highest sensitivity on the photo sensor 10 according to a relationship of the initial and second distances of Lmax and Lsens.

Let Q1' be a point which lies on the contour line 25 as borderline between the low-reflectance region 23 and the high-reflectance region 24 and which is defined by projecting the maximum sensitivity point P1 on to the test surface 11a when the sensitivity of the photo sensor 10 is maximized after passing of the center O3 of the sensor surface 10c by the point h. The point Q1' is near to the point h. Also, according to symmetrical forms of the test disk 11 and the eccentric circle 20, the point Q1' is positioned symmetrically to the point Q1 with respect to the chord 21 as axis of the symmetry. In other words, the point Q1' is defined at a point where the contour line 25 between the low-reflectance region 23 and the high-reflectance region 24 is intersected by a circle which is defined about the center O1 of the test disk 11 and has a diameter Lmax. The point Q1' is rotationally offset at an angle of (π−θ) from the point f in the clockwise direction. Consequently, measured time of the section from the point close to the point f to the point Q1' is equal to the measured time T2 of the section from the point Q1 to the point f.

Let P2 and P3 be points located at ends of the sensitive region of the photo sensor 10. See also FIG. 7. Let Q2 and Q3 be points on the contour line 25 and obtained by projecting the point P2 and P3 on to the test surface 11a. The point Q2 exists in the vicinity of the point g where the output of the photoreceptor element 10b starts dropping from the High level. The point Q3 exists in the vicinity of the point i where the output of the photoreceptor element 10b starts keeping the Low level. The host computer 16 determines a distance Lmin1 from the point Q2 to the center O1 of the test disk 11, and a distance Lmin2 from the point Q3 to the center O1 of the test disk 11, by the equations of:

$$Lmin1 = [(R2)^2 - (E\sin\phi)^2]^{1/2} - E\cos\phi$$

$$Lmin2 = [(R2)^2 - (E\sin\delta)^2]^{1/2} - E\cos\delta$$

An angle φ (in radian) is defined between the chord 21 and a line that passes the point Q2 and the rotational center O1 of the test disk 11. See FIG. 4. Let T3 be measured time elapsed while the phase of the test disk 11 comes between a point close to the point f and the point Q2. T2 also expresses the measured time elapsed while the phase of the test disk 11 comes between a point close to the point f and the point Q1'. The angle φ has a value expressed by T2 and T3 as follows:

$$\phi = (\pi-\theta)T3/T2$$

An angle δ (in radian) is defined between the chord 21 and a line that passes the point Q3 and the rotational center O1 of the test disk 11. See FIG. 4. Let T4 be measured time elapsed while the phase of the test disk 11 comes between a point close to the point f and the point Q3. T2 also expresses the measured time elapsed while the phase of the test disk 11 comes between a point close to the point f and the point Q1'. The angle δ has a value expressed by T2 and T4 as follows:

$$\delta = (\pi-\theta)T4/T2$$

The host computer 16 calculates and obtains the sensitive width W of the sensitivity distribution of the photo sensor 10 on the basis of the differences Lmin1−Lmax and Lmax−Lmin2 between Lmin1, Lmin2 and Lmax. See FIG. 7. Then the host computer 16 determines the sensitivity distribution D2 in a two-dimensional space by considering various terms which are Lsens, Lmax, Lmin1, Lmin2, W and the output of the photoreceptor element 10b. See a lower portion of FIG. 6. It is noted that a horizontal axis of the graph in the lower portion of the drawing is drawn for the value of standardized sensitivity, assuming that the output of the photoreceptor element 10b is 1 when the sensitivity is maximized in the vicinity of the point h.

Figure 7:
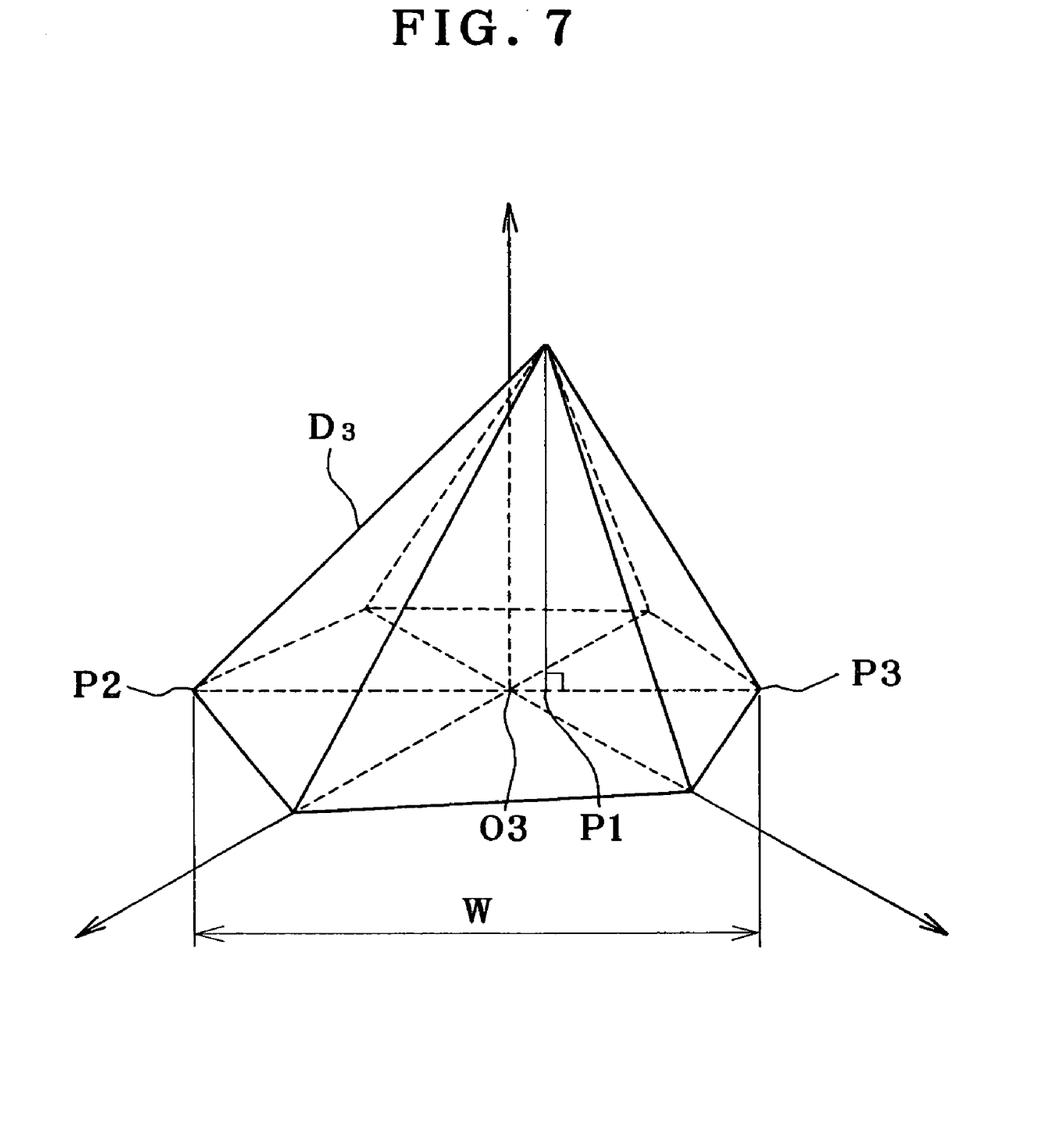
FIG. 7 is a graph illustrating a three-dimensionally expressed sensitivity distribution.
Figure 8:
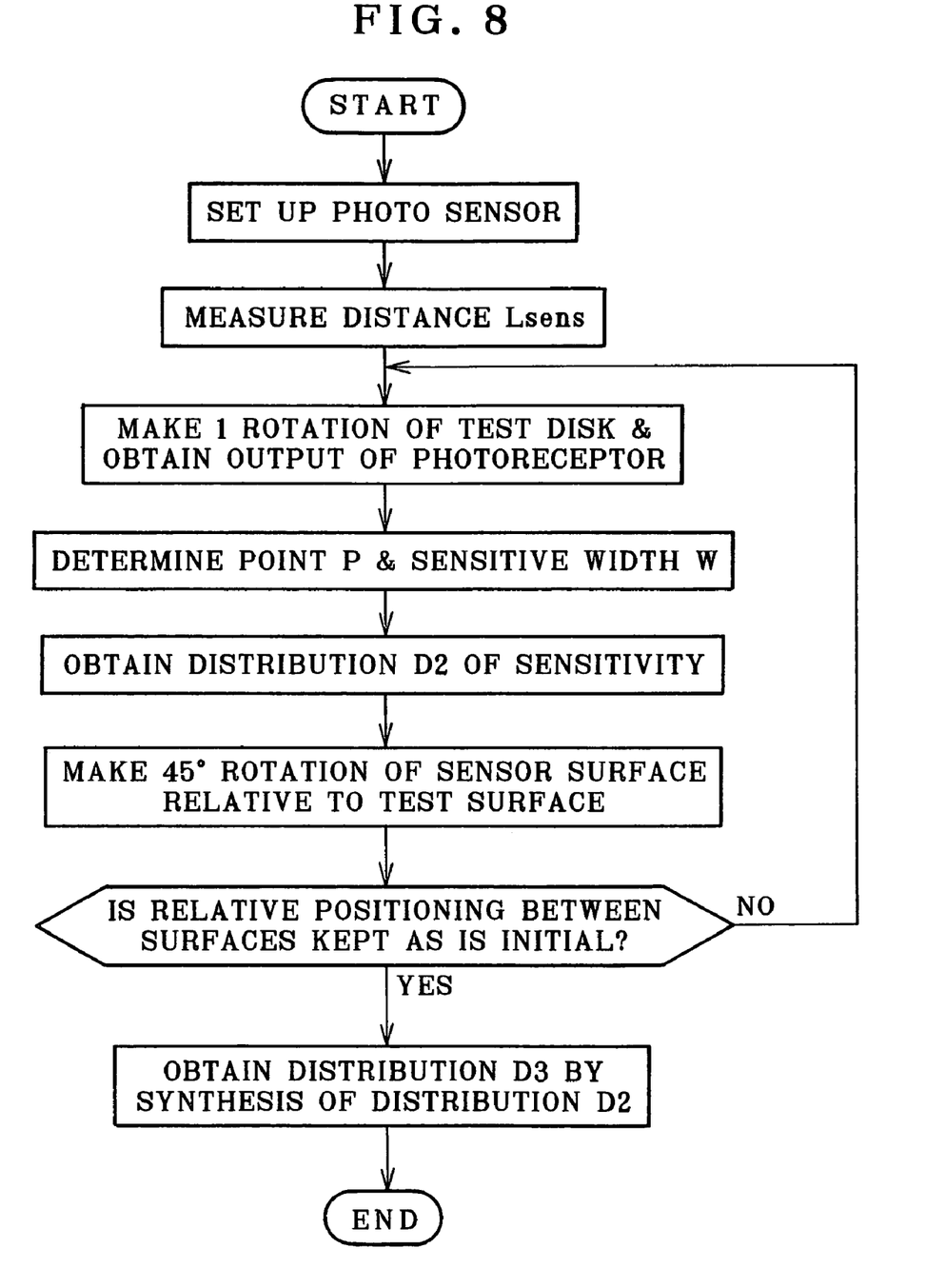
FIG. 8 is a flow chart illustrating a flow of steps for measuring the sensitivity corrections.

The host computer 16 controls the first stepping motor 14 to rotate, and causes the sensor surface 10c to rotate relative to the test surface 11a by 45 degrees or a ⅛ rotation. The second stepping motor 15 is driven for each of the times, so as to make one rotation of the test disk 11 at a regular speed relative to the photo sensor 10 in the counterclockwise direction indicated by the arrow. The sensitivity distribution D2 is determined in a process similar to the above. The host computer 16 administers the number of drive pulses to send to the first stepping motor 14, and repeatedly effects in the same operation until a relationship between the sensor surface 10c and the test surface 11a in the position comes to their initial relationship. Seven data of the sensitivity distribution D2 are obtained, and synthesized by combining one another, to obtain a sensitivity distribution D3 as illustrated in FIG. 7 in a three-dimensional expression.

Consequently, the sensitivity distribution D3 of the photo sensor 10 in the three-dimension expression can be obtained only by making one rotation of the test disk 11 at the regular speed, obtaining the output of the photoreceptor element 10b, and repeating the same for plural times of the rotation of the sensor surface 10c with respect to the test disk 11. In the use of the photo sensor 10, an object to be photoelectrically detected can be disposed at the point P1 with the highest sensitivity. The detection of the photo sensor 10 can be optimized with the highest precision by use of the detecting performance.

Note that there is no particular limitation of the test disk 11 having the eccentric circle 20 according to the invention. The test disk 11 can have a pattern or sign other than the low-reflectance reference line 22 or the low-reflectance region 23.

Figure 9:
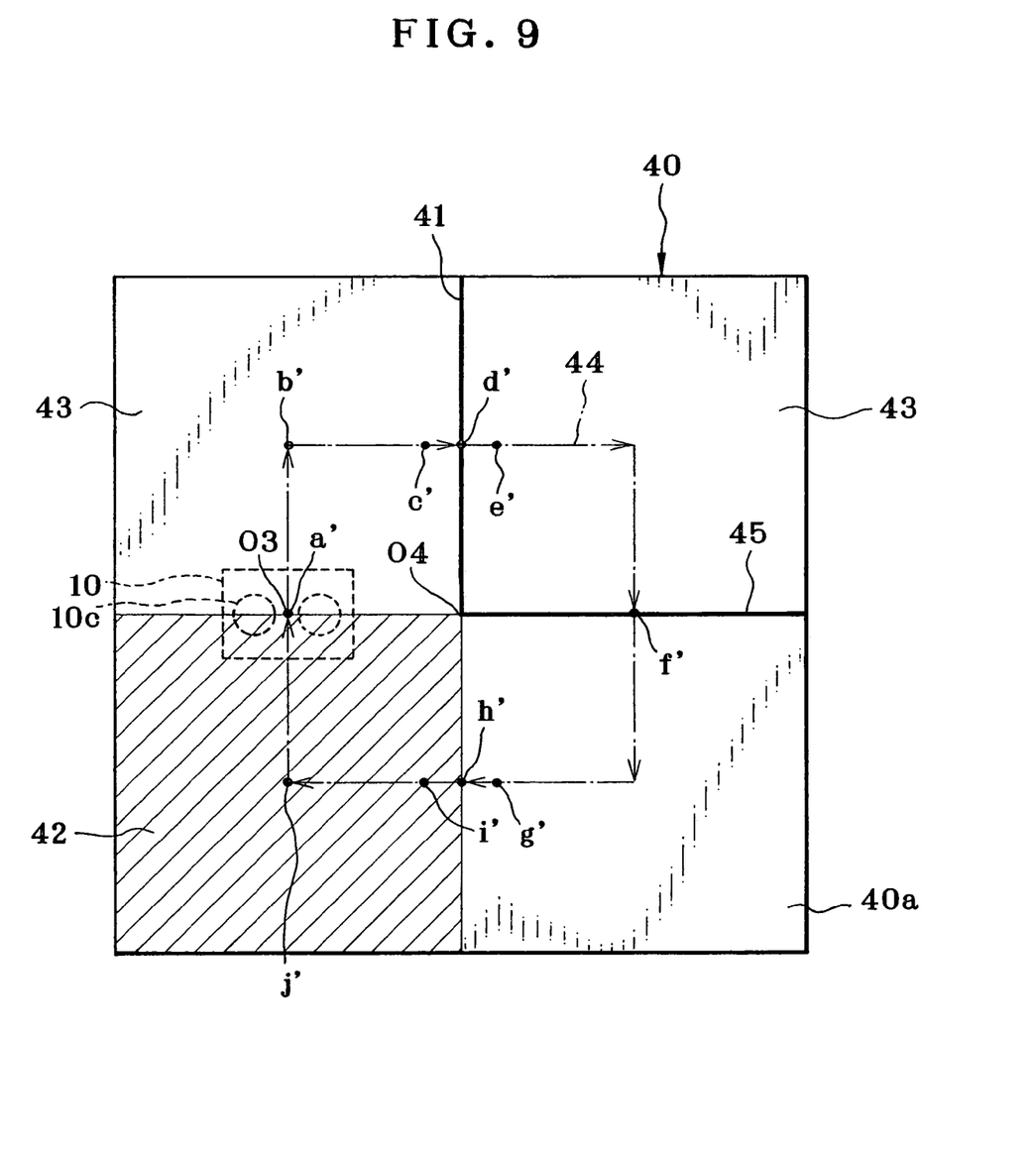
FIG. 9 is a front elevation illustrating another preferred embodiment of a variant test panel.

Another preferred test panel 40 is illustrated in FIG. 9. The test panel 40 has a shape of a regular quadrilateral. A low-reflectance or black reference line 41 in a test pattern or test image is formed to extend from the center O4 toward a middle point of an upper side line of the test panel 40. A low-reflectance or black region 42 is disposed on a lower side line and a left side line, and has an area a one fourth as large as the test panel 40. Also, a high-reflectance or white region 43 is defined as a remaining region on the test panel 40. Specifically, one of the photo sensor 10 and the test panel 40 is moved at a regular speed so as to move the center O3 of the sensor surface 10c along a locus 44. For the locus 44, see the phantom line in the drawing. The output of the photoreceptor element 10b and the relative position of the center O4 of the test panel 40 and the center O3 of the sensor surface 10c are considered so as to determine sensitivity distribution D2. The sensor surface 10c is rotated relative to a sensor surface or disposition surface 40a to obtain plural values of the sensitivity distribution D2. After this, the plurality of the values are combined together, in order to determine a sensitivity distribution D3 of the three-dimensional expression. Note that the several points from a' to j' are designated to correspond to the points a-j in the above embodiment. A reference line 45 in the test pattern is used to represent a position of having made half a turn of the locus 44 in the similar manner to the chord 21 of the above embodiment.

Furthermore, a rotational angle of the sensor surface 10c relative to the test surface 11a may be a value smaller than 45 degrees, for example, 5 degrees, which is effective to use higher fineness in the sensitivity distribution D3. Alternatively, sensitivity distribution with lower fineness may be used, in particular a less fine characteristic of a gradient from the point P2 to the point P1 or from the point P1 to the point P3 in the sensitivity distribution. A two-dimensionally expressed sensitivity distribution D2 may be determined by passage of the low-reflectance reference line 22, and evaluating an output of the photoreceptor element 10b from the vicinity of the point c to the vicinity of the point e in FIG. 4, and evaluating relative positions of the sensor surface 10c and the test surface 11a.

Figure 10:
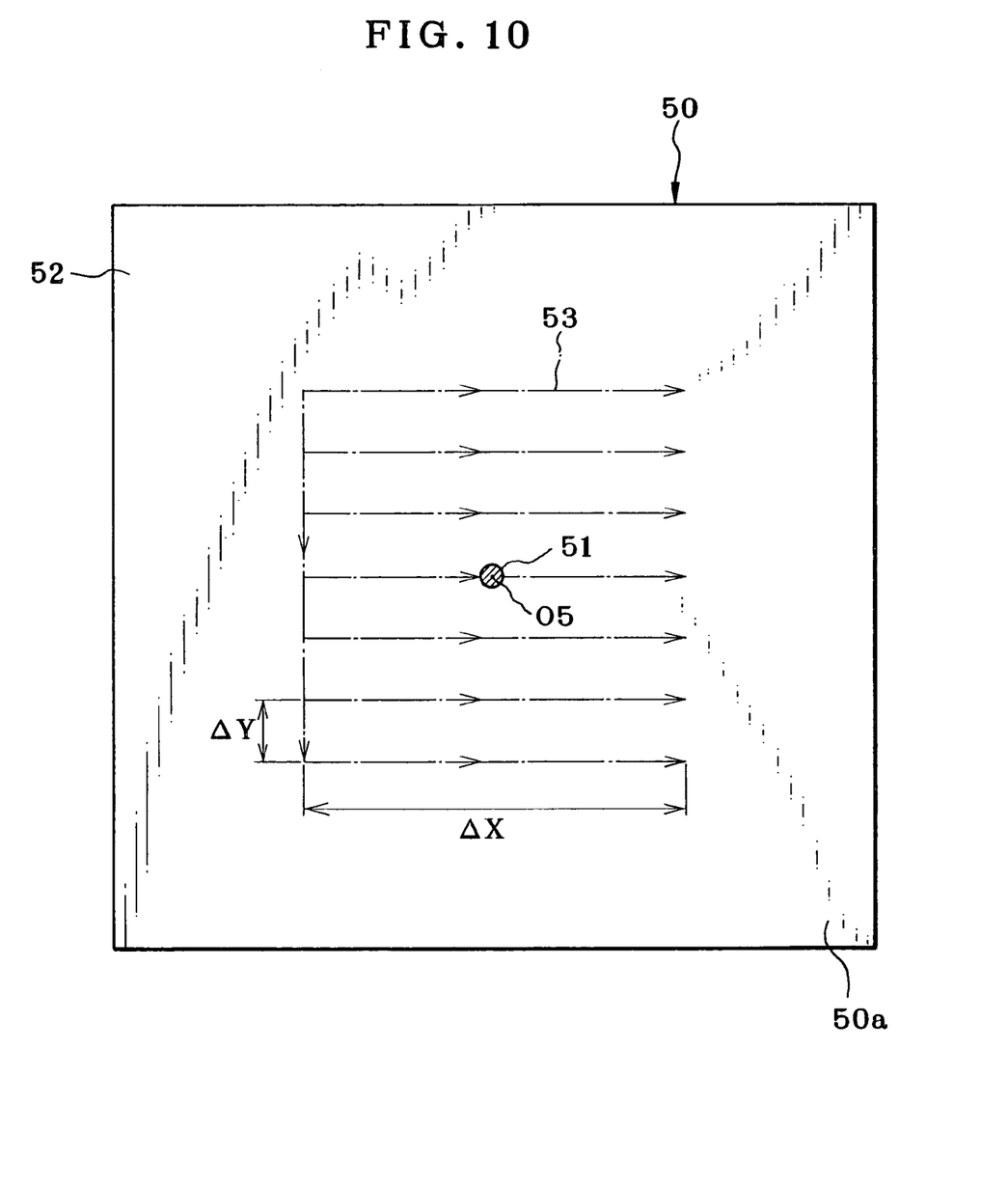
FIG. 10 is a front elevation illustrating still another preferred embodiment of a variant test panel.

In FIG. 10, another preferred test panel 50 is illustrated. A low-reflectance or black reference dot 51 in a test pattern or test image is formed on the test panel 50 at its center O5. A high-reflectance or white region 52 is defined by the remainder of the test panel 50 about the low-reflectance reference dot 51. A locus 53 is indicated in the drawing by the phantom line. One of the photo sensor 10 and the test panel 50 is moved at a regular speed in the horizontal direction of the locus 53 so as to cause the center O3 of the sensor surface 10c to move by an amount $\Delta X$. An output of the photoreceptor element 10b is evaluated in the course of this, to obtain two-dimensional sensitivity distribution D2. This is repeated each time that one of the photo sensor 10 and the test panel 50 is shifted in the vertical direction of the locus 53 by an amount $\Delta Y$, so as to obtain plural results of sensitivity distribution D2. Then the plural results are synthesized by the combination, in order to obtain three-dimensional sensitivity distribution D3. Note that a preferable size of the low-reflectance reference dot 51 can be sufficiently large so as to keep the output of the photoreceptor element 10b analyzable.

In the above embodiment, each of the test disk 11, and test panels 40 and 50 has a black-and-white pattern. However, a two-step reflectance test pattern or test image on a test panel according to the invention can be any two colors distinct from one another in the highness of reflectance.

Note that the test disk 11 may not rotate at a regular speed. In FIG. 4, a horizontal axis can be taken for a rotational position of the test disk 11 represented by the number of pulses supplied to the stepping motor.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A measuring method of measuring distribution of sensitivity of a photo sensor, wherein said photo sensor has a light projector disposed on a sensor surface, and a photoreceptor disposed on said sensor surface, said measuring method comprising steps of:
    disposing said photo sensor to oppose said sensor surface to a test panel which has a test pattern formed on a surface thereof;
    shifting said photo sensor rotationally and stepwise while said sensor surface is opposed to said test panel;
    moving said test panel relative to said photo sensor at each time of rotational shifting of said photo sensor;
    monitoring and receiving an output of said photoreceptor while said test panel moves relatively;
    determining said sensitivity distribution expressed two-dimensionally according to said output of said photoreceptor; and
    synthesizing said sensitivity distribution expressed two-dimensionally at respective times of said rotational shifting, to determine three-dimensionally expressed sensitivity distribution.

2. A measuring method as defined in claim 1, wherein said test panel is moved relative to said photo sensor at a regular speed.

3. A measuring method as defined in claim 2, further comprising a step of displaying said three-dimensionally expressed sensitivity distribution.

4. A measuring method as defined in claim 2, wherein said test panel is rotatable, of which said surface has a white color;
    said test pattern has a circle eccentric with respect to a rotational center of said test panel, and a black line;
    said circle has first and second semicircles, said first semicircle has a contour line of a black color and a white region defined inside said contour line, said second semicircle has a black color, and said line is constituted by an extension of a borderline between said first and second semicircles.

5. A measuring method as defined in claim 4, wherein said test panel is a test disk, and said line extends toward a periphery of said test disk.

6. A measuring method as defined in claim 5, wherein said step of determining said sensitivity distribution expressed two-dimensionally includes:
    determining a point where sensitivity of said photo sensor is maximized according to said output of said photoreceptor and said rotational shifting during passage of said contour line or said line in front of said photo sensor;
    determining a sensitive width of said photo sensor according to said output of said photoreceptor and said rotational shifting during passage of said second semicircle in front of said photo sensor; and
    determining a triangular region having a vertex at said maximum-sensitivity point and a base line along said sensitive width, to define said sensitivity distribution expressed two-dimensionally.

7. A measuring method as defined in claim 2, wherein said surface of said test panel has a white color, said test pattern has a black line;
- said step of determining said sensitivity distribution expressed two-dimensionally includes:
- determining a point where sensitivity of said photo sensor is maximized, and a sensitive width of said photo sensor, according to said output of said photoreceptor and said rotational shifting during passage of said line in front of said photo sensor; and
- determining a triangular region having a vertex at said maximum-sensitivity point and a base line along said sensitive width, to define said sensitivity distribution expressed two-dimensionally.

8. A measuring method as defined in claim 2, wherein said photo sensor moves relative to said test panel being stationary.

9. A measuring method as defined in claim 8, further comprising a step of displaying said three-dimensionally expressed sensitivity distribution.

10. A measuring method as defined in claim 8, wherein said surface of said test panel has a white color, and said test pattern has a black region in a substantially quadrilateral shape, and a black line extending from one side of said black region.

11. A measuring method as defined in claim 8, wherein said surface of said test panel has a white color, and said test pattern has at least one black dot.

12. A measuring device for measuring distribution of sensitivity of a photo sensor, wherein said photo sensor has a light projector disposed on a sensor surface, and a photoreceptor disposed on said sensor surface, said measuring device comprising:
- a test panel having a test pattern formed on a surface thereof;
- a rotating mechanism for shifting said photo sensor rotationally and stepwise while said sensor surface is opposed to said test panel;
- a moving mechanism for moving said test panel relative to said photo sensor at each time of rotational shifting of said photo sensor;
- a first determining unit for determining said sensitivity distribution expressed two-dimensionally according to an output of said photoreceptor while said test panel moves relatively;
- a second determining unit for synthesizing said sensitivity distribution expressed two-dimensionally at respective times of said rotational shifting, to determine three-dimensionally expressed sensitivity distribution.

13. A measuring device as defined in claim 12, wherein said moving mechanism moves one of said test panel and said photo sensor at a regular speed.

14. A measuring device as defined in claim 13, further comprising a display panel for displaying said three-dimensionally expressed sensitivity distribution.

15. A measuring device as defined in claim 13, wherein said test panel is rotatable, of which said surface has a white color;
- said test pattern has a circle eccentric with respect to a rotational center of said test panel, and a black line;
- said circle has first and second semicircles, said first semicircle has a contour line of a black color and a white region defined inside said contour line, said second semicircle has a black color, and said line is constituted by an extension of a borderline between said first and second semicircles.

16. A measuring device as defined in claim 15, wherein said test panel is a test disk, and said line extends toward a periphery of said test disk.

17. A measuring device as defined in claim 16, wherein said first determining unit determines a point where sensitivity of said photo sensor is maximized according to said output of said photoreceptor and said rotational shifting during passage of said contour line or said line in front of said photo sensor;
- determines a sensitive width of said photo sensor according to said output of said photoreceptor and said rotational shifting during passage of said second semicircle in front of said photo sensor; and
- determines a triangular region having a vertex at said maximum-sensitivity point and a base line along said sensitive width, to define said sensitivity distribution expressed two-dimensionally.

18. A measuring device as defined in claim 13, wherein said surface of said test panel has a white color, said test pattern has a black line;
- said first determining unit determines a point where sensitivity of said photo sensor is maximized, and a sensitive width of said photo sensor, according to said output of said photoreceptor and said rotational shifting during passage of said line in front of said photo sensor; and
- determines a triangular region having a vertex at said maximum-sensitivity point and a base line along said sensitive width, to define said sensitivity distribution expressed two-dimensionally.

19. A measuring device as defined in claim 13, wherein said photo sensor moves relative to said test panel being stationary.

20. A measuring device as defined in claim 19, wherein said surface of said test panel has a white color, and said test pattern has a black region in a substantially quadrilateral shape, and a black line extending from one side of said black region.

21. A measuring device as defined in claim 19, wherein said surface of said test panel has a white color, and said test pattern has at least one black dot.

* * * * *